UNITED STATES PATENT OFFICE.

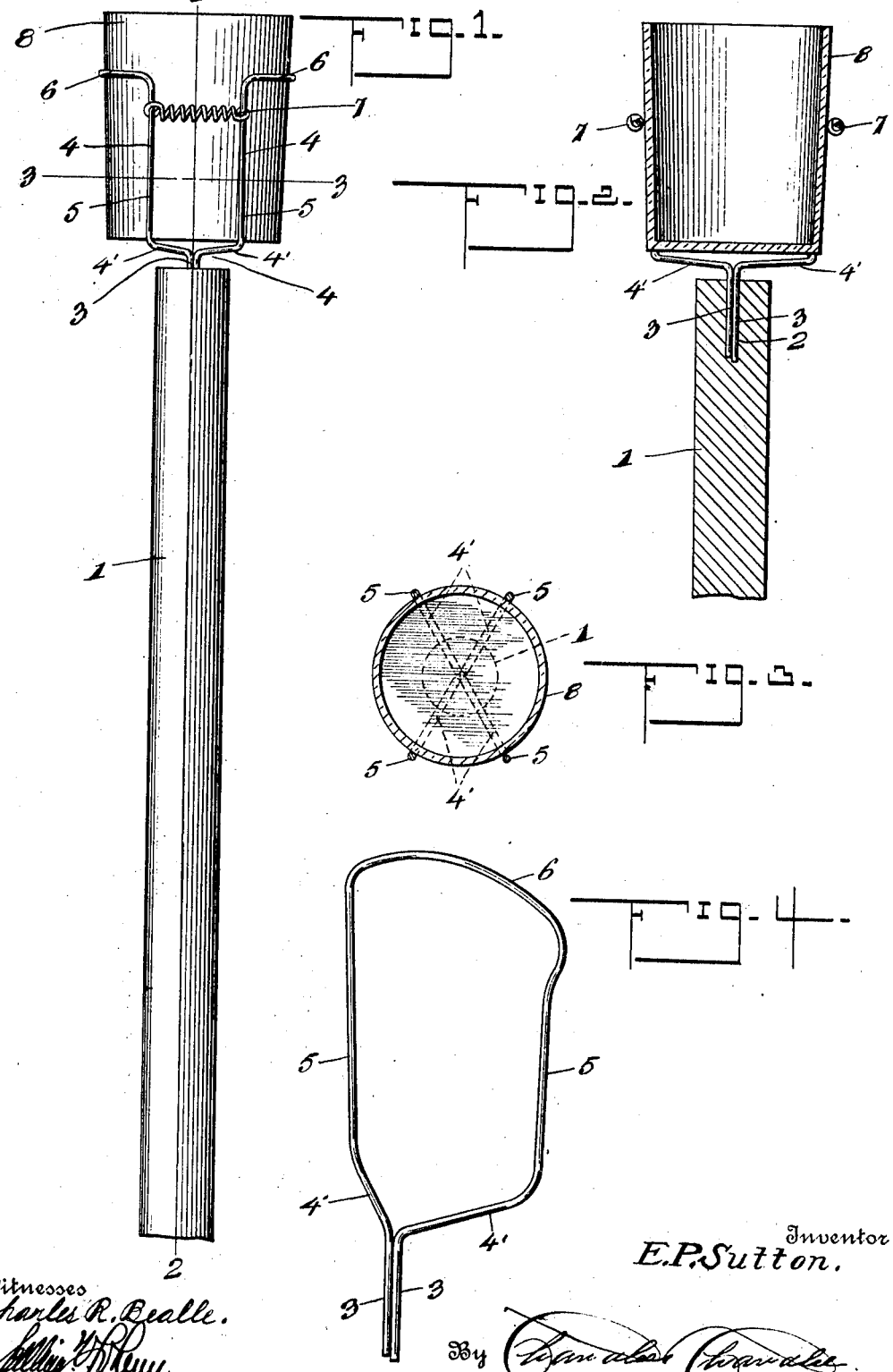

ELEANOR P. SUTTON, OF ELLSWORTH, MAINE.

INSECT CATCHER AND DESTROYER.

1,055,240.  Specification of Letters Patent.  Patented Mar. 4, 1913.

Application filed August 22, 1912. Serial No. 716,522.

*To all whom it may concern:*

Be it known that I, ELEANOR P. SUTTON, a citizen of the United States, residing at Ellsworth, in the county of Hancock, State of Maine, have invented certain new and useful Improvements in Insect Catchers and Destroyers; and I do hereby declare the following to be a full, clear, and exact description of the invention, such as will enable others skilled in the art to which it appertains to make and use the same.

This invention is directed to improvements in insect catchers and destroyers, and has for its object to so construct a device of this type that flies or other insects may be trapped upon a ceiling of a room.

A further object of the invention is to so construct a device of this character that the insects trapped will fall into a receptacle and be killed.

With these and other objects in view, this invention resides in the novel features of construction, formations, combinations and arrangements of parts to be hereinafter more fully described, claimed and illustrated in the accompanying drawing, in which:—

Figure 1 is a side elevation of the device. Fig. 2 is a sectional view on line 2—2 of Fig. 1. Fig. 3 is a sectional view on line 3—3 of Fig. 1. Fig. 4 is a detail perspective view of one of the jaws.

Referring to the drawing, the numeral 1 designates the handle, which is of such length that it may be raised so that the upper end thereof will be in convenient reach of the ceiling of the room.

The upper end of the stick 1 is provided with a socket 2 for receiving the vertical portions 3 of the jaws 4, said jaws being formed from a single length of resilient wire, the portions 3 of which terminate in convergingly arranged horizontal portions 4' which in turn terminate in vertical spaced arms 5, the upper ends of which are connected by outwardly curved bars 6.

The arms 5 of each jaw are connected by coil springs 7 so that said jaws will firmly clamp therebetween the glass receptacle 8, the bottom of which rests upon the portions 4'.

The glass receptacle 8 is partially filled with soapy water in which the insect will fall after being trapped upon the ceiling by the receptacle. If desired any suitable sticky substance may be substituted for the water.

It is obvious that the receptacle 8 may be formed from metal, hard rubber or the like, but glass is deemed preferable for the reason that the condition of the insect may be noted during the trapping operation.

In operation the receptacle 8 is raised by the stick 1 until the mouth thereof rests against the ceiling thus inclosing the insect so that when it falls it will drop into the receptacle and will be destroyed.

What is claimed is:—

An insect catcher of the class described comprising a handle, a socket formed in the upper end of the handle, a pair of oppositely disposed jaws formed from resilient wire and consisting of vertical portions adapted to fit in said socket, said portions terminating in convergingly arranged horizontal portions, the last named portions terminating in spaced parallel vertical arms having their upper ends connected by outwardly curved bars, a glass receptacle having an open mouth, said receptacle being adapted to be clamped between said jaws and having its base engaging the horizontal portions, coil springs connecting the vertical arms near their upper ends for holding the outwardly curved bars in tight engagement with the receptacle near its mouth.

In testimony whereof, I affix my signature, in presence of two witnesses.

ELEANOR P. SUTTON.

Witnesses:
S. W. SUTTON,
JOHN A. PETERS.